(12) United States Patent
Ebner

(10) Patent No.: US 9,821,964 B2
(45) Date of Patent: Nov. 21, 2017

(54) FEEDER FOR FEEDING CUT PIECES OF WOOD

(71) Applicant: Springer Maschinenfabrik AG, Friesach (AT)

(72) Inventor: Franz Ebner, Winklern (AT)

(73) Assignee: Springer Maschinenfabrik AG, Friesach (AT)

( * ) Notice: Subject to any disclaimer, the term of this patent is extended or adjusted under 35 U.S.C. 154(b) by 0 days.

(21) Appl. No.: 15/116,960

(22) PCT Filed: Feb. 4, 2015

(86) PCT No.: PCT/AT2015/000017
§ 371 (c)(1),
(2) Date: Aug. 5, 2016

(87) PCT Pub. No.: WO2015/117171
PCT Pub. Date: Aug. 13, 2015

(65) Prior Publication Data
US 2017/0174443 A1    Jun. 22, 2017

(30) Foreign Application Priority Data

Feb. 7, 2014 (AT) .................................... A 90/2014

(51) Int. Cl.
*B65G 47/52* (2006.01)
*B65G 47/88* (2006.01)
(Continued)

(52) U.S. Cl.
CPC ........... *B65G 47/52* (2013.01); *B65G 47/086* (2013.01); *B65G 47/8823* (2013.01);
(Continued)

(58) Field of Classification Search
CPC .... B65G 47/90; B65G 47/901; B65G 47/907; B65G 47/842; B65G 25/04; B65G 17/32
(Continued)

(56) References Cited

U.S. PATENT DOCUMENTS 3,923,142 A    12/1975 Rysti
4,573,862 A *  3/1986 Anderson ............ B65G 47/901
                                                    198/468.2
(Continued)

FOREIGN PATENT DOCUMENTS

CA         2 271 175     11/2000
DE      102005019734     11/2006
(Continued)

OTHER PUBLICATIONS

International Search Report issued by the European Patent Office in International Application PCT/AT2015/000017.

*Primary Examiner* — James R Bidwell
(74) *Attorney, Agent, or Firm* — Henry M. Feiereisen LLC

(57) ABSTRACT

In a feeder (1) for feeding cut pieces of wood (2) from an accumulation conveyor (3) to a carrier conveyor (4), according to the invention, the feeder (1) comprises a first clamping jaw (6) that is disposed on a first moving device (5) as well as a second clamping jaw (8) that is arranged on a second moving device (7), the first clamping jaw (6) and the second clamping jaw (8) form a clamping unit (10) for clamping a cut piece of wood (2) in a conveying zone (9) and conveying the cut piece of wood (2) in a clamped state as the first clamping jaw (6) and the second clamping jaw (8) perform a movement in the same direction.

12 Claims, 2 Drawing Sheets

(51) Int. Cl.
*B65G 47/08* (2006.01)
*B65G 47/90* (2006.01)
*B65G 47/32* (2006.01)

(52) U.S. Cl.
CPC .............. *B65G 47/32* (2013.01); *B65G 47/90* (2013.01); *B65G 2201/0282* (2013.01)

(58) Field of Classification Search
USPC .............................. 198/468.2, 468.9, 750.11
See application file for complete search history.

(56) References Cited

U.S. PATENT DOCUMENTS

| | | | | |
|---|---|---|---|---|
| 4,697,487 | A | * 10/1987 | Cameron | .............. B27B 29/085 144/378 |
| 5,921,376 | A | 7/1999 | Michell et al. | |
| 2003/0183485 | A1 | * 10/2003 | Zeibig | ................. B21D 43/055 198/468.9 |

FOREIGN PATENT DOCUMENTS

| | | | |
|---|---|---|---|
| EP | 2 163 498 | | 3/2010 |
| FR | 2 676 955 | | 12/1992 |
| GB | 2143791 | * 2/1985 | ............. B65G 47/90 |
| JP | 52-96194 | | 8/1977 |

* cited by examiner

FEEDER FOR FEEDING CUT PIECES OF WOOD

CROSS-REFERENCES TO RELATED APPLICATIONS

This application is the U.S. National Stage of International Application No. PCT/AT2015/000017, filed Feb. 4, 2015, which designated the United States and has been published as International Publication No. WO 2015/117171 and which claims the priority of Austrian Patent Application, Serial No. A 90/2014, filed Feb. 7, 2014, pursuant to 35 U.S.C. 119(a)-(d).

BACKGROUND OF THE INVENTION

The invention relates to a feeder for feeding cut pieces of wood from an accumulation conveyor to a carrier conveyor.

Feeding is a processing step in wood processing, during which cut pieces of wood, for example, cut wooden boards, are transferred from a non-cyclic conveyance into a cyclic conveyance. In this case, the cut pieces of wood are provided in the noncyclic conveyance as an accumulated film of cut pieces of wood pressing against one another, wherein the cut pieces of wood are transferred individually by the feeder to a carrier conveyor, wherein one cut piece of wood is to be assigned per carrier of the carrier conveyor. Conventional feeders can have actuable rollers, lifting tables, or star wheels for this purpose, which transfer individual cut pieces of wood in the cycle of the carriers of the carrier conveyor.

This has the disadvantage that the cut pieces of wood have to be strongly accelerated during the feeding, wherein different acceleration movements of the cut pieces of wood frequently occur due to the different geometries and due to the inhomogeneity of the workpiece, because the cut pieces of wood sometimes differ strongly from one another in the physical properties, or one cut piece of wood is not completely grasped by the feeder. Movements of the pieces of wood which are not guided in parallel thus occur, which cause incorrect placement in the subsequent transfer into the carrier conveyor, and this has to be manually corrected again. This results in an increased susceptibility to failure in the region of the feeder, above all with an increasing number of cycles.

SUMMARY OF THE INVENTION

The object of the invention is therefore to specify a feeder of the type mentioned at the outset, using which the mentioned advantages can be avoided, and using which feeding of the cut pieces of wood from an accumulation conveyor to a carrier conveyor can take place reliably even with a high number of cycles.

This is achieved according to the invention by a feeder for feeding cut pieces of wood from an accumulation conveyor to a carrier conveyor, wherein the feeder has a first clamping jaw, which is arranged on a first movement device, and a second clamping jaw, which is arranged on a second movement device, and the first clamping jaw and the second clamping jaw form a clamping unit, to clamp a cut piece of wood in a conveyor region and to transport it in a clamped state by way of an identically-oriented movement of the first clamping jaw and the second clamping jaw.

The advantage thus results that the feeding of cut pieces of wood takes place reliably even with a high number of cycles and, linked thereto, also at high accelerations, because the individual cut piece of wood is clamped during the feeding and therefore restricted in its freedom of movement. In this case, the cut piece of wood can be clamped by the two clamping jaws and be accelerated in this state and transferred in an orderly manner to the carrier conveyor. Due to the positively-guided acceleration of the cut pieces of wood, a low susceptibility to failure of the feeding procedure is achieved and, linked thereto, a very high facility efficiency is reached.

The invention furthermore relates to a feeding system having this feeder.

Furthermore, the invention relates to a method for feeding cut pieces of wood using a feeder as set forth above.

The object of the invention is therefore furthermore to specify a method for feeding cut pieces of wood using a feeder, using which the mentioned advantages can be avoided, using which feeding of the cut pieces of wood from an accumulation conveyor to a carrier conveyor can be performed reliably even at high cycle rates.

The advantages of the method correspond to the advantages of the feeder.

The dependent claims relate to further advantageous embodiments of the invention.

Reference is hereby expressly made to the wording of the patent claims, whereby the claims are incorporated at this point by reference into the description and are considered to be reproduced verbatim.

BRIEF DESCRIPTION OF THE DRAWING

The invention will be described in greater detail with reference to the appended drawings, in which preferred embodiments are merely illustrated as examples. In the figures.

DETAILED DESCRIPTION OF PREFERRED EMBODIMENTS

Figure 1:
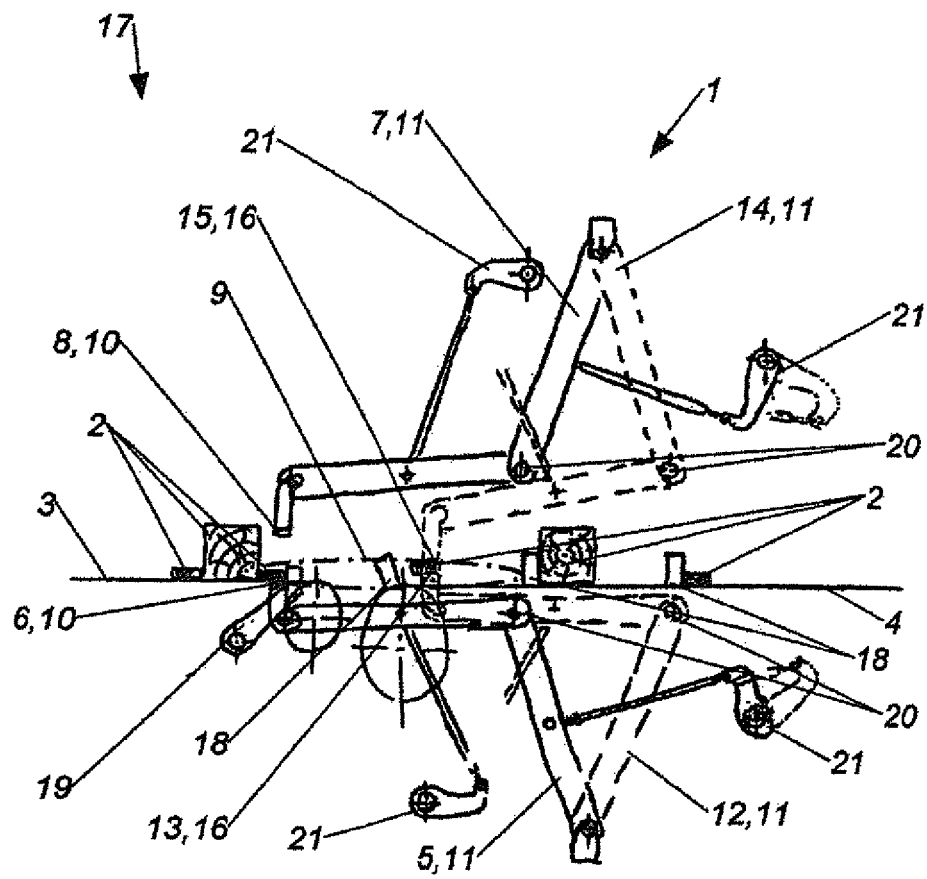
FIG. 1 shows a first preferred embodiment of a feeder system in a side view.
Figure 2:
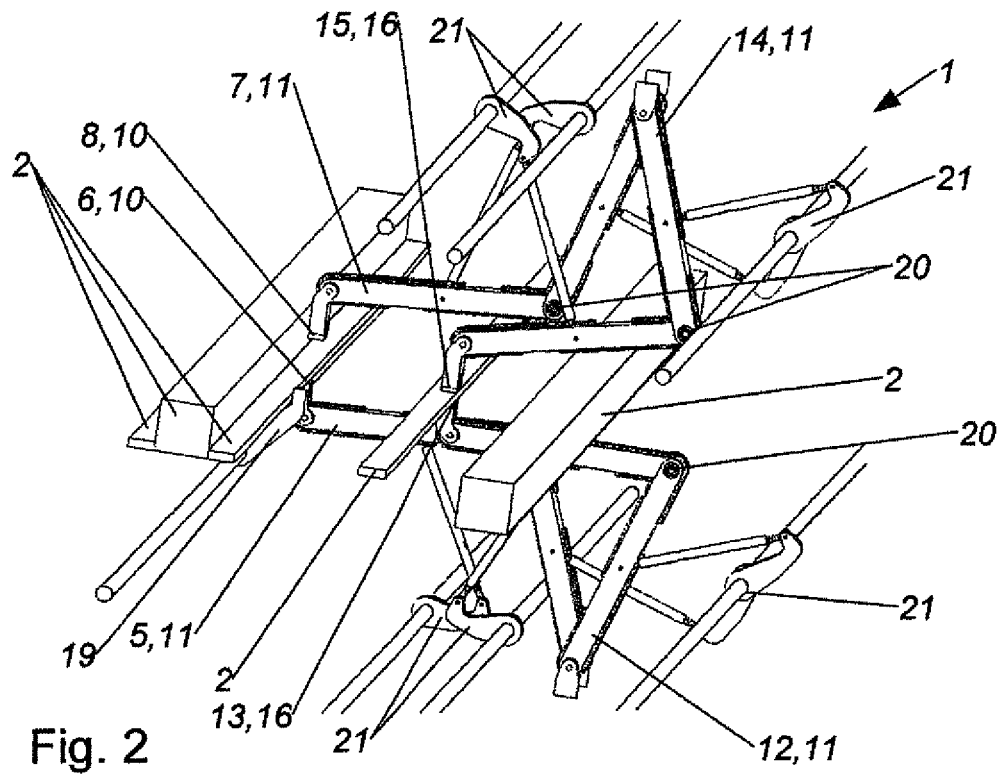
FIG. 2 shows a part of the first preferred embodiment of the feeder system as an axonometric illustration.
Figure 3:
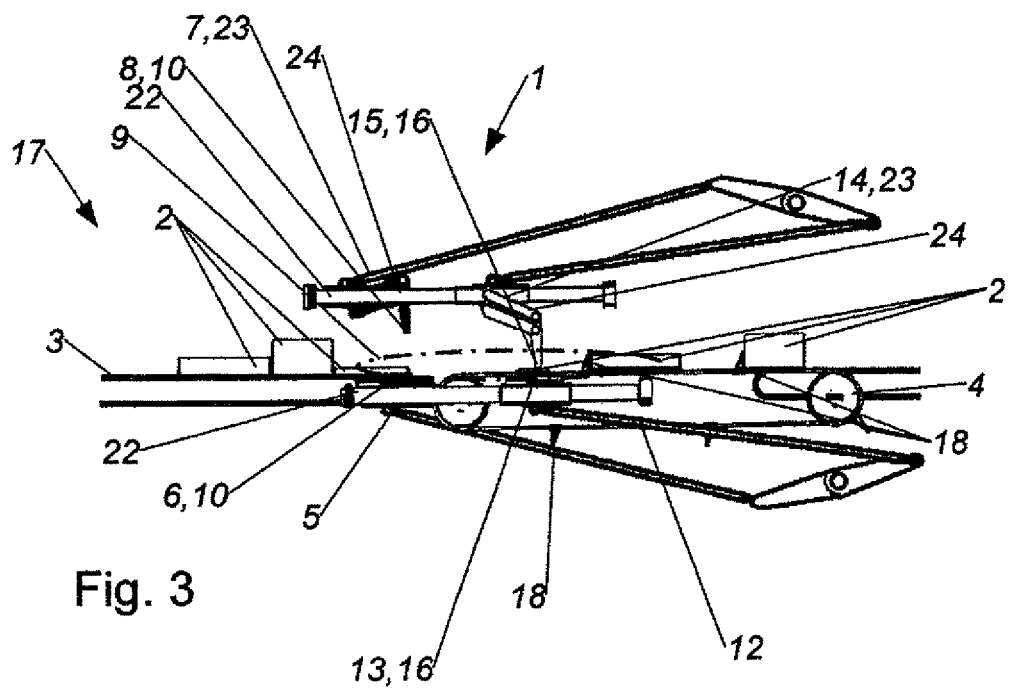
FIG. 3 shows a second preferred embodiment of a feeder system in a side view.

FIGS. 1 to 3 show preferred embodiments of a feeder 1 for feeding cut pieces of wood 2 from an accumulation conveyor 3 to a carrier conveyor 4. A feeder 1 is a device in wood processing, in which cut pieces of wood, in particular lumber and/or cut wooden boards, are transferred from a noncyclic conveyance, in particular in the form of an accumulation conveyor 3, into a cyclic conveyance, in particular in the form of a carrier conveyor 4, wherein individual cut pieces of wood are transferred in a targeted manner from the accumulation conveyor 3 to the carrier conveyor 4.

It is provided that the feeder 1 has a first clamping jaw 6, which is arranged on a first movement device 5, and a second clamping jaw 8, which is arranged on a second movement device 7, and the first clamping jaw 6 and the second clamping jaw 8 form a clamping unit 10, to clamp a cut piece of wood 2 in a conveyor region 9 and to transport it in a clamped state by an identically-oriented movement of the first clamping jaw 6 and the second clamping jaw 8.

The advantage thus results that the feeding of cut pieces of wood also takes place reliably at high cycle rates and, linked thereto, also with high accelerations, since the individual cut piece of wood 2 is clamped during the feeding and is therefore restricted in its freedom of movement and/or the feeding takes place in a defined manner in the movement direction. In this case, the cut piece of wood 2 can be clamped by the two clamping jaws 6, 8 and accelerated in this clamped state and relayed in an orderly manner to the carrier conveyor 4. Due to the positively-guided acceleration of the cut pieces of wood 2, a low susceptibility to failure of the feeding procedure is achieved and, linked thereto, a very high facility efficiency is achieved.

Furthermore, a feeding system 17 comprising an accumulation conveyor 3 and a carrier conveyor 4 is provided, wherein the feeder 1 is arranged between the accumulation conveyor 3 and the carrier conveyor 4, to transport a cut piece of wood 2 from the accumulation conveyor 3 to the carrier conveyor 4. The conveyor region 9 extends in this case from the accumulation conveyor 3, where the cut pieces of wood 2 are grasped by the feeder 1, up to the carrier conveyor 4, where the cut pieces of wood 2 are released again by the feeder 1. The carrier conveyor 4 can in particular have a plurality of carriers 18, wherein one cut piece of wood 2 is to be fed per carrier 18.

In particular, it can be provided that the accumulation conveyor 3 and/or the carrier conveyor 4 are designed as transverse conveyors, i.e., they transport the cut piece of wood 2 transversely to its longitudinal extension.

Furthermore, a method for feeding cut pieces of wood 2 using the feeder 1 is provided, wherein the cut piece of wood 2 is clamped in a grasping region of the conveyor region 9 between the first clamping jaw 6, which is arranged on the first movement device 5, and the second clamping jaw 8, which is arranged on the second movement device 7, wherein the cut piece of wood 2 is transported by an identically-oriented movement of the first clamping jaw 6 and the second clamping jaw 8 in a clamped state through the conveyor region 9 and released again in a dropping region of the conveyor region 9.

The clamping jaws 6, 8 are provided to clamp the cut piece of wood 2 between them and therefore fix it. The first clamping jaw 6 and the second clamping jaw 8 together form a clamping unit 10, which is provided to clamp a single cut piece of wood 2. In this case, the first clamping jaw 6 can have a first clamping surface and the second clamping jaw 8 can have a second clamping surface, wherein at least in the clamped state, the first clamping surface is arranged in parallel to the second clamping surface, and furthermore the first clamping surface is particularly preferably arranged precisely opposite to the second clamping surface.

The first clamping jaw 6 is arranged so it is movable in a pre-definable manner by a first movement device 5, and the second clamping jaw 8 is arranged so it is movable in a pre-definable manner by a second movement device 7. In this case, in particular the respective Clamping jaws 6, 8 can be arranged fixedly on the respective movement device 5, 7, wherein the clamping forces for the clamping jaws 6, 8 are generated by the movement devices 5, 7 and relayed via the clamping jaws 6, 8 to the cut piece of wood.

The clamping of the cut piece of wood 2 is particularly preferably performed by a linear relative movement of the first clamping jaw 6 and the second clamping jaw 8 toward one another, wherein the two clamping surfaces particularly preferably remain parallel to one another.

In particular, it can be provided that during the clamping, the clamping jaws 6, 8 move together on the normal in relation to a surface of the cut piece of wood 2, i.e., no lateral movement component in relation to the cut piece of wood 2 occurs during the clamping. Monitored and well-controllable clamping thus occurs on well definable points, without the cut piece of wood 2 already being accelerated during the clamping without being completely clamped.

Furthermore, it can be provided that the cut piece of wood 2 is accelerated by the movement devices 5, 7 only after clamping is completely performed by the clamping jaws 6, 8.

Furthermore, it can preferably be provided that the clamping unit 10 has a pre-definable plurality of first clamping jaws 6 and second clamping jaws 8, and the first clamping jaws 6 are arranged along a transverse extension of the feeder 1 and move in parallel with one another. In this case, the individual clamping jaws 6, 8 can in particular each be arranged on a separate movement device 5, 7. The transverse extension of feeder 1 is parallel to the longitudinal extension of the cut piece of wood 2. A single cut piece of wood 2 can thus be clamped by multiple clamping jaws 6, 8 and transported reliably.

Alternatively, it can be provided that the clamping unit 10 comprises in each case a first clamping jaw 6 and a second clamping jaw 8, which in particular clamp the cut piece of wood 2 in the center. Due to the central clamping, the torques of the cut piece of wood 2 during acceleration are kept low. Such an embodiment is shown in FIG. 2.

The conveyor region 9 is the spatial region which is traversed by the cut pieces of wood 2 during the transport. In this case, the grasping region, i.e., the region at which the feeder 1 clamps a single cut piece of wood 2, is arranged at a first end of the conveyor region and the dropping region, i.e., the region at which the feeder 1 releases the individual cut piece of wood 2 again, is arranged at the second end of the conveyor region, opposite to the first end.

In particular, it can be provided that the movement devices 5, 7, at least during the return thereof, i.e., a movement from the dropping region to the grasping region, preferably remain in operation outside the conveyor region 9, whereby a returning movement device 5, 7 cannot collide with a transported cut piece of wood 2.

In particular, it can be provided that the feeder 1 is designed as a transverse conveyor, and the first clamping surface and the second clamping surface are oriented in parallel to the transverse extension of the feeder 1 in the clamped state of the cut piece of wood 2. The first clamping surface and the second clamping surface can be arranged horizontally in this case—viewed in the operating position—i.e., in parallel to a footprint (not shown in the figure) of the feeder 1. Multiple clamping units 10, 16 can thus easily be moved adjacent to one another, without mutually obstructing one another, since they can simply grasp at different points along the longitudinal extension of the cut piece of wood 2.

It can preferably be provided that the conveyor region 9 is arranged between the first movement device 5 and the second movement device 7. Due to the arrangement of the movement devices 5, 7 on both sides of the conveyor region 9, cut pieces of wood 2 of greatly varying sizes can also be reliably clamped and thus fed even at high cycle rates. Since the movement devices 5, 7 do not engage in the conveyor region 9, furthermore a plurality of movement devices 5, 7, 12, 14 and clamping jaws 6, 8, 13, 15 can easily be used, without these mutually blocking one another. An increase of the cycle rate can also be achieved in this case.

It can preferably be provided that—viewed in the operating position—the first movement device 5 is arranged below the conveyor region 9, and in particular the second movement device 7 is arranged above the conveyor region 9. This has the advantage that at least for the first movement device 5, it is well predictable when the first clamping jaw 6 comes into contact with the cut piece of wood 6.

According to one embodiment (not shown), it can be provided that the first movement device 5 is arranged below the conveyor region 9, and the second movement device 7 is also arranged below the conveyor region 9 during a return movement, and penetrates the conveyor region 9 in the grasping region to clamp the cut piece of wood 2, so that the second clamping jaw 8 can press the cut piece of wood 2 from above against the first clamping jaw 6. In the dropping region, the second movement device 7, when the cut piece of wood 2 has been released, is again moved completely out of the conveyor region 9, so that the second movement device 7 does not represent an obstruction in the conveyor region 9. This embodiment has the advantage that the feeder can be designed compactly, since a structure above the conveyor region 9 can be omitted.

In particular, it can be provided that the movement devices 5, 7 are continuously arranged outside the conveyor region 9 in operation. This can be achieved in that the movement devices 5, 7 are entirely arranged on opposite sides of the conveyor region 9. This is visible, for example, in the preferred embodiments of FIGS. 1 to 3.

The cut piece of wood 2 is clamped in the conveyor region 9 by the clamping unit 10 and it is accelerated and transported in the clamped state by an identically-oriented movement of the first clamping jaw 6 and the second clamping jaw 8. The identically-oriented movement in this sense means that the first clamping jaw 6 and the second clamping jaw 8 do not change the relative position and orientation in relation to one another during the transport.

It can be provided in this case that the first clamping surface and the second clamping surface are movable toward one another into a clamping position in the grasping region by a movement of the first movement device 5 and the second movement device 7, to clamp a single cut piece of wood 2 between the first clamping surface and the second clamping surface.

Furthermore, it can preferably be provided that the first clamping surface and the second clamping surface are movable away from one another into a release position in the dropping region by a movement of the first movement device 5 and the second movement device 7, in order to release the clamped cut piece of wood 2 in the dropping region.

After release of the cut piece of wood 2, the clamping jaws 6, 8 are moved by the movement devices 5, 7 back to the grasping region. This return can be performed particularly rapidly due to the arrangement of the movement devices 5, 7 outside the conveyor region 9.

It can particularly preferably be provided that the conveyor region 9 is essentially planar. This means that the cut piece of wood 2 is accelerated and transported in the clamped state essentially in a plane, i.e., in a translational manner along a straight line. The advantage thus results that no torques arise during the transport of the cut piece of wood 2, which could free the cut pieces of wood from the clamping.

The conveyor region 9 can be arranged essentially horizontally.

In this case, the first clamping surface and the second clamping surface can particularly preferably each remain in a plane extending in parallel during the transport of the cut piece of wood 2.

It can particularly preferably be provided that an acceleration of the cut piece of wood 2 during the feeding exclusively takes place in the state clamped by the first clamping jaw 6 and the second clamping jaw 8.

It can particularly preferably be provided that a carrier 18 of the carrier conveyor 4 moves at a carrier velocity in a dropping region of the conveyor region 9, and the clamping unit 10 releases the cut piece of wood 2 in the dropping region during a movement taking place in parallel to the carrier 18.

It can be provided in this case that the carrier 18 of the carrier conveyor 4 is moved in the dropping region of the conveyor region 9 at the carrier velocity, and the cut piece of wood 2 is accelerated in the clamped state to the carrier velocity and is transferred to the carrier 18, and subsequently is released by the first clamping jaw 6 and the second clamping jaw 8. It can be provided in particular in this case that the cut piece of wood 2 is already leaning against the carrier 18 before the cut piece of wood 2 is released by the clamping unit 10. The transfer of the cut piece of wood 2 to the carrier conveyor 4 can thus take place without an acceleration of the cut piece of wood 2 in the non-clamped state.

The accumulation conveyor 3 can be designed in particular as a conveyor belt and/or a roller belt, in the case of which the individual cut pieces of wood 2 are transported up to a stop, which is already arranged in the conveyor region 9, in particular in the grasping region. The cut pieces of wood 2 press against one another at this stop and accumulate.

It can preferably be provided that the accumulation conveyor 3 has a sensor system, which is operationally connected to the feeder 1 and the grasping region of the conveyor region 9, and a clamping movement of the clamping unit 10 only takes place if a cut piece of wood 2 is detected in the grasping region by the sensor system. It can preferably be provided that the sensor system is operationally connected to a control device of the feeder 1, which controls the movement devices. The sensor system can be designed in particular as a light barrier system. It can be ensured by the sensor system that a cut piece of wood is actually arranged in the grasping region, which can be grasped by the clamping jaws 6, 8.

Furthermore, it can be provided that the sensor system measures a height—extending in the vertical direction in the operating position—of a cut piece of wood 2, which is arranged in the grasping region, and relays this measured height to the feeder 1, in particular the control device. The clamping jaws 6, 8 can be controlled in a targeted manner to the respective height by way of the information about the height of the cut piece of wood to be clamped, wherein cut pieces of wood 1 having a broad variation of the width can be fed rapidly and reliably.

Furthermore, it can be provided that at least one of the clamping jaws 6, 8 and/or at least one of the movement devices 5, 7 has a pressure pickup. The pressure pickup can be connected to the control unit in particular. A predefined clamping force of the clamping jaws 6, 8 can be achieved by the pressure pickup.

The pressure pickup can in particular be arranged in a damping element. In this case, it can be provided that the damping element is arranged between the first clamping jaw 6 and/or the second clamping jaw 8 and the associated movement device 5, 7.

It can particularly preferably be provided that the accumulation conveyor 3 comprises a movable accumulation conveyor retention hook 19 in a grasping region of the conveyor region 9. The accumulation conveyor retention hook 19 forms a pre-definable removable stop for the accumulation conveyor 3 in this case. In this case, a cut piece of wood 2 is transported by the accumulation conveyor 3 until it presses against the accumulation conveyor retention hook 19. This cut piece of wood 2 is then clamped by the feeder and the accumulation conveyor retention hook 19 is moved out of a retention position, wherein it releases the clamped cut piece of wood 2, which is then transported away by the feeder 1, preferably horizontally. The accumulation conveyor retention hook 19 is then moved back into the retention position, to retain following cut pieces of wood 2 of the accumulation conveyor 3. The movable accumulation conveyor retention hook 19 has the advantage that the feeder 1 does not have to lift the clamped cut piece of wood 2 over the stop, whereby a torque would be generated. The stop can furthermore be designed as particularly tall due to the accumulation conveyor retention hook 19, whereby a cut piece of wood having great height which strikes against the stop cannot rotate over the stop.

Alternatively, a fixed stop can be provided, wherein the feeder 1 moves the cut piece of wood 2 over it.

It can particularly preferably be provided that the first movement device 5 and/or the second movement device 7 are designed as articulated arms 11. In particular, the first movement device 5 and/or the second movement device 7 can be designed as articulated arms having a pivot joint 20 between two arm segments. Due to the design having articulated arms 11, the feeder can be designed in a particularly versatile manner and can be used for a large variation of differently formed cut pieces of wood 2. FIGS. 1 and 2 show a preferred embodiment of the feeder, in which the movement devices 5, 7 are designed as articulated arms 11.

The arm 11 can in particular be mounted in an articulated manner at a first end and can have the clamping jaws 6, 8 at a second end.

Furthermore, it can be provided that an axis of rotation of the pivot joint 20 extends in parallel to the transverse extension of the feeder 1. In particular, it can be provided that the arm 11 moves essentially within a plane extending perpendicularly to the transverse extension of the feeder 1. A plurality of movable arms 11 can thus be arranged along the transverse extension of the feeder 1, without mutually obstructing one another in the movement.

The movement of the arms 11 can be produced in particular by means of a servocontroller 21. The servocontroller 21 can be controlled by means of the control device.

Furthermore, it can be provided that the first movement device 5 and/or the second movement device 7 comprises a carriage 23, which is movable in a pre-definable manner along a rail 22, and the first clamping jaw 6 and/or the second clamping jaw 8 are arranged so they are movable on the carriage 23 via a movement element 24. The rails 22 can extend in parallel to the conveyor region in particular. The movement element 24 enables a movement of the clamping jaws 6, 8 perpendicularly to the movement direction of the carriage 23. The movement devices 5, 7 can be designed particularly simply by way of the carriage 23, wherein an actuation of the movement elements 24 is only necessary for clamping or releasing the cut piece of wood. FIG. 3 shows a preferred embodiment of the feeder, in which the movement devices 5, 7 comprise carriages.

Furthermore, it can particularly preferably be provided that the feeder 1 has a third clamping jaw 13 arranged on a third movement device 12 and a fourth clamping jaw 15 arranged on a fourth movement device 14, the third clamping jaw 13 and the fourth clamping jaw 15 form a further clamping unit 16, to clamp a further cut piece of wood 2 in the conveyor region 9 with a phase shift to the clamping unit 10 formed by the first clamping jaw 6 and the second clamping jaw 8 and to transport it by an identically-oriented movement of the third clamping jaw 13 and the fourth clamping jaw 15 in a clamped state. The further clamping unit 16 can be arranged offset in relation to the clamping unit 10 along the transverse extension of the feeder 1 in this case. The further clamping unit 16 can be operated similarly to the clamping unit 10. An additional cut piece of wood 2 can be fed per movement cycle of the feeder 1 by the further clamping unit 16, whereby still higher cycle rates of the carrier conveyor 4 are possible. The further clamping unit 16 is shown by dashed lines in FIG. 1.

The invention claimed is:

1. A feeder for feeding cut pieces of wood from an accumulation conveyor to a carrier conveyor, said feeder cormprising:
    a conveyor region;
    a first movement device arranged below the conveyor region, when viewed in an operating position;
    a second movement device;
    a first clamping unit including a first clamping jaw arranged on the first movement device and a second clamping jaw arranged on the second movement device, said first clamping unit being configured to clamp a cut piece of wood in an essentially planar conveyor region and to transport it in a clamped state by way of an identically-oriented movement of the first clamping jaw and the second clamping jaw;
    at least one member selected from the group consisting of the first movement device and the second movement device being configured as articulated arms having a pivot joint between two arm segments; and
    a third movement device, a fourth movement device, a second clamping unit including a third clamping jaw arranged on the third movement device and a fourth clamping jaw arranged on the fourth movement device, said second clamping unit being configured to clamp a further cut piece of wood in the conveyor region with a phase shift to the first clamping unit and to transport it by an identically-oriented movement of the third clamping jaw and the fourth clamping jaw in a clamped state.

2. The feeder of claim 1, wherein the conveyor region is arranged between the first movement device and the second movement device.

3. The feeder of claim 1, wherein the second movement device is arranged above the conveyor region.

4. A feeder system, comprising:
    an accumulation conveyor;
    a carrier conveyor; and
    a feeder arranged between the accumulation conveyor and the carrier conveyor to transport a cut piece of wood from the accumulation conveyor to the carrier conveyor, said feeder comprising a conveyor region, a first movement device arranged below the conveyor region, when viewed in an operating position, a second movement device, and a first clamping unit including a first clamping jaw arranged on the first movement device and a second clamping jaw arranged on the second movement device, said first clamping unit being configured to clamp a cut piece of wood in an essentially planar conveyor region and to transport it in a clamped state by way of an identically-oriented movemet of the first clamping jaw and the second clamping jaw, at least one member selected from the group consisting of the first movement device and the second movement device being configured as articulated arms having a pivot joint between two arm segments, wherein the feeder comprises a third movement device, a fourth movement device, a second clamping unit including a third clamping jaw arranged on the third movement device and a fourth clamping jaw arranged on the fourth movement device, said second clamping unit being configured to clamp a further cut piece of wood in the conveyor region with a phase shift to the first clamping unit and to transport it by an identically-oriented movement of the third clamping jaw and the fourth clamping jaw in a clamped state.

5. The feeder system of claim 4, wherein the conveyor region is arranged between the first movement device and the second movement device.

6. The feeder system of claim 4, wherein the second movement device is arranged above the conveyor region.

7. The feeder system of 4, wherein the carrier conveyor comprises a carrier which moves in a dropping region of the conveyor region at a carrier velocity, said first clamping unit configured to release the cut piece of wood in the dropping region during a movement in parallel relationship to the carrier.

8. The feeder system of claim 4, wherein the accumulation conveyor comprises a movable accumulation conveyor retention hook in a grasping region of the conveyor region.

9. The feeder system of claim 4, wherein the accumulation conveyor includes in a grasping region of the conveyor region a sensor system which is operationally connected to the feeder, said first clamping unit configured to execute a clamping movement only when a cut piece of wood is detected in the grasping region by the sensor system.

10. A method for feeding cut pieces of wood, comprising:
clamping a cut piece of wood in a grasping region of a conveyor region of a feeder between a first clamping jaw on a first movement device arranged below the conveyor region viewed in an operating position, and a second clamping jaw on a second movement device, with at least one member selected from the group consisting of the first movement device and the second movement device being configured as articulated arms having a pivot joint between two arm segments;
clamping a further cut piece of wood in the conveyor region of the feeder between a third clamping law arranged on a third movement device, and a fourth clamping jaw arranged on a fourth movement device;
transporting the cut piece of wood by an identically-oriented movement of the first, and second clamping jaws in a clamped state through the conveyor region essentially in a plane;
transporting the further cut piece of wood by an identically-oriented movement of the, third and fourth clamping jaws in a clamped state through the conveyor region essentially in a plane; and
releasing the cut piece of wood and the further cut piece of wood in a dropping region of the conveyor region.

11. The method of claim 10, further comprising arranging the conveyor region between the first movement device, and the second movement device.

12. The method of claim 10, further comprising:
moving a carrier of a carrier conveyor in a dropping region of the conveyor region at a carrier velocity;
accelerating the cut piece of wood in the clamped state to the carrier velocity;
transferring the cut piece of wood to the carrier; and
subsequently releasing the cut piece of wood by the first, and second clamping jaws.

* * * * *